United States Patent [19]

Woodruff et al.

[11] Patent Number: 5,450,762
[45] Date of Patent: Sep. 19, 1995

[54] REACTIONLESS SINGLE BEAM VIBRATING FORCE SENSOR

[75] Inventors: James R. Woodruff, Redmond; David W. Wine, Bellevue, both of Wash.

[73] Assignee: AlliedSignal Inc., Morris Township, N.J.

[21] Appl. No.: 320,565

[22] Filed: Oct. 11, 1994

Related U.S. Application Data

[63] Continuation of Ser. No. 991,743, Dec. 17, 1992, abandoned.

[51] Int. Cl.⁶ .................................................. G01L 1/00
[52] U.S. Cl. ............................... 73/862.59; 73/DIG. 1; 73/704
[58] Field of Search ....... 73/862.59, DIG. 4, DIG. 1, 73/704, 852.59; 310/370

[56] References Cited

U.S. PATENT DOCUMENTS

| | | | |
|---|---|---|---|
| 3,190,129 | 6/1965 | Kritz et al. | 73/517 |
| 3,470,400 | 9/1969 | Weisbord | 310/15 |
| 4,215,570 | 8/1980 | EerNisse | 73/862.59 |
| 4,321,500 | 3/1982 | Paros et al. | 310/321 |
| 4,372,173 | 2/1983 | EerNisse et al. | 73/862,59 |
| 4,410,827 | 10/1983 | Kogure | 310/370 |
| 4,415,827 | 11/1983 | Chuang | 310/370 |
| 4,459,042 | 7/1984 | Paros | 73/DIG. 1 |
| 4,538,461 | 9/1985 | Juptner et al. | 310/370 |
| 4,651,569 | 3/1987 | Paros et al. | 73/704 |
| 4,654,663 | 3/1987 | Alseng et al. | 310/370 |
| 4,785,215 | 11/1988 | Blech | 310/370 |
| 4,901,586 | 2/1990 | Blake et al. | 73/862.59 |
| 4,920,296 | 4/1990 | Takahashi et al. | 310/370 |
| 5,142,913 | 9/1992 | Delatorre | 73/704 |
| 5,367,217 | 11/1994 | Norling | 310/370 |

*Primary Examiner*—Richard Chilcot
*Assistant Examiner*—Ronald L. Biegel
*Attorney, Agent, or Firm*—Howard G. Massung

[57] ABSTRACT

A reactionless single beam vibrating force transducer utilizes counterbalances at opposite ends of the beam that rotate in directions opposite to the ends of the vibrating beam to reduce rotational and normal forces transmitted to the end supports for the beam. The proportions of the counterbalances relative to the size of the beam may be chosen to reduce forces in a direction normal to the beam to zero at the expense of some rotational moments at the end of the beam support, or to reduce moments at the expense of some normal force. The relative amounts of residual rotational moments and normal force can be adjusted to suit particular applications. Flexures may also be utilized to reduce the rotational moments transferred to the beam support even further.

17 Claims, 1 Drawing Sheet

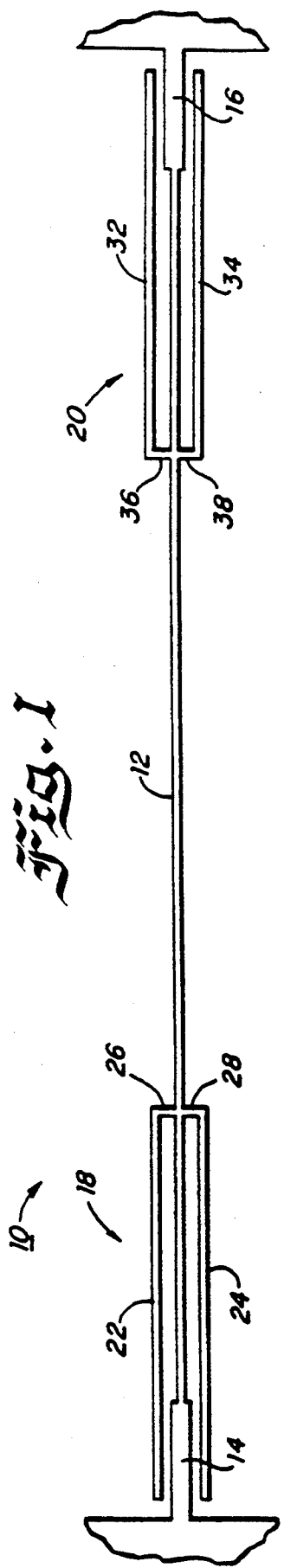

REACTIONLESS SINGLE BEAM VIBRATING FORCE SENSOR

This application is a continuation of application Ser. No. 07/991,743 filed Dec. 17, 1992, now abandoned.

BACKGROUND OF THE INVENTION

1. Field of the Invention

The present invention relates generally to vibrating beams, including piezoelectric or silicon beams that may be piezoelectrically, electromagnetically, electrostatically or thermally driven, and particularly to vibrating beams that are utilized as force sensors, for example, accelerometers. In particular, the present invention relates to a method and apparatus for reducing the reaction forces transferred to the beam supporting structure to thereby improve the mechanical Q of the vibratory system.

2. Description of the Prior Art

Various transducers, including accelerometers, utilize one or more vibrating beams that vibrate laterally or in various other modes. The resonant frequency of such a beam is raised when the beam is subject to tension and lowered when subjected to compression. The transducer is designed so that the physical quality to be measured results in tension or compression being applied to the vibrating beam or beams so that the frequency of vibration of the beam or beams is a measure of the amplitude of the quantity being measured.

The performance of a vibrating beam is degraded if there is a transfer of energy to other structures, for example the beam supporting structure through reaction forces at the ends of the beam. Such mechanical coupling between the beam and supporting structure can lower the Q of the beam and cause undesirable frequency shifts.

One prior art method used to reduce the problems of energy transfer is the utilization of multiple beams vibrating out of phase to cancel reaction forces as is done in the case of a double-ended tuning fork. The double-ended tuning fork utilizes two beams located side-by-side that vibrate in opposite directions to cancel the reaction forces. Examples of multiple beam resonators utilized to cancel reaction forces are disclosed in U.S. Pat. Nos. 4,215,570; 4,372,173; 4,415,827 and 4,901,586.

Another approach used to reduce the transfer of energy from the beam to the mounting structure is to employ vibration isolators between the ends of the beams and the supporting structure. Such isolators usually have an isolation mass at each end of the vibrating beam and a resilient member between each isolation mass and the supporting structure. The resilient members permit the beam and the isolator masses to move relative to the supporting structure in order to reduce the amount of energy transferred from the vibrating mass to the supporting structure.

The isolation systems are most effective when the isolator masses are large and the isolation springs are compliant. Such large isolator masses and compliance springs result in a low resonant frequency for the isolation system which is undesirable, particularly in accelerometer applications. In addition, isolation systems attenuate the reaction forces applied to the supporting structure, but cannot completely eliminate them.

SUMMARY

Accordingly, it is an object of the present invention to provide a vibrating beam transducer that overcomes many of the disadvantages of the prior art vibrating beam transducers.

It is yet another object of the present invention to provide a relatively simple vibrating beam transducer that transmits very little energy to its supporting structure.

It is yet another object of the present invention to provide a high Q vibrating beam transducer that is relatively simple and inexpensive to manufacture.

It is yet another object of the present invention to provide a vibrating beam transducer wherein all normal vibration forces at the end of the vibrating beam can be effectively eliminated.

It is yet another object of the present invention to provide a vibrating beam transducer wherein all rotational moments at the end of the vibrating beam can be effectively eliminated.

It is yet another object of the present invention to provide a vibrating beam transducer wherein the balance between the normal forces and the rotational moments appearing at the end of the beam can be optimized for a particular application.

Thus, in accordance with an important aspect of the invention, a counterbalancing structure is provided at each end of the vibrating beam to cancel reaction forces appearing at the end of the beam. The counterbalances move in directions opposite that of the ends of the beam in order to cancel both rotational moment and normal force in a direction normal to the longitudinal axis of the beam. By selecting the size and geometry of the counterbalances relative to that of the beam, either rotational moment or normal force may be completely cancelled; however, when one is cancelled, there is a residual amount of the other present. However, the system may be designed to balance the amounts of residual normal force and rotational moment to optimize the relative amounts of each for a particular application. In addition, flexures may be interposed between the ends of the vibrating beam and the supporting structure to reduce the amount of torque applied to the mounting structure.

BRIEF DESCRIPTION OF THE DRAWING

These and other objects and advantages of the present invention will become readily apparent upon consideration of the following detailed description and attached drawing, wherein:

FIG. 1 is a simplified schematic diagram illustrating the general structure of the present invention;

FIG. 2 is a simplified schematic diagram illustrating the addition of flexures to reduce the transfer of torque from the vibrating beam to the supporting structure; and FIG. 3 is a diagram of the structure of FIG. 2 displaced during vibration and illustrates the operation of the invention.

DETAILED DESCRIPTION OF THE PREFERRED EMBODIMENT

Referring now to the drawing, with particular attention to FIG. 1, there is shown a vibratory force transducer generally designated by the reference numeral 10. The transducer 10 utilizes a vibrating beam 12 which may be fabricated from a piezoelectric or non-piezoelectric material such as crystalline or non-crystalline quartz, crystalline or polycrystalline silicon or from other suitable materials that vibrate with a reasonably high quality factor or Q. The vibrating beam may be driven by a variety of drives, including piezoelectric, electrostatic, electromagnetic and thermal drives in a conventional fashion.

The beam 12 is supported by a pair of end supports 14 and 16 that extend from a housing or another similar structure. A pair of counterbalances 18 and 20 are disposed at opposite ends of the beam 12. The counterbalance 18 has a pair of outwardly extending members 22 and 24 that extend beyond the end of the beam 12 in a direction generally parallel to the end of the beam 12. The members 22 and 24 are supported from the beam 12 by a pair of spacers 26 and 28 that hold the members 22 and 24 in a spaced relationship with the beam 12. The spacing between the members 22 and 24 and the beam 12 is made sufficiently large to prevent the members 22 and 24 from touching the support during vibration. The counterbalance 20 also has a pair of outwardly extending members 32 and 34 similar to the members 22 and 24 that are held in a spaced relationship from the beam 12 by a pair of spacers 36 and 38.

Each of the counterbalances 18 and 20 is positioned along the beam 12 at a point along the beam that rotates as the beam vibrates. The outwardly extending members of each of the counterbalances extend in a direction such that part of the motion of each counterbalance caused by the rotation of the section of the beam to which it is attached is in a direction opposite to that of the beam. The proportions of the members 22, 24 and 32, 34 relative to the size of the beam 12 may be selected so that the total momentum of the vibrating beam in a direction normal to the beam length is zero in order to eliminate normal reaction forces on the supporting members 14 and 16. Proportions for a particular design can be conveniently calculated and verified by finite element analysis.

Another embodiment of the transducer of FIG. 1 is illustrated in FIG. 2. In the embodiment of FIG. 2, like components are designated by the same reference numerals as in FIG. 1, but the reference numerals in FIG. 2 are primed. As previously stated, the normal force at the ends of the beam 12 can be cancelled, but when such cancellation occurs, there is a residual torque moment. Consequently, in the embodiment shown in FIG. 2, a reduced thickness section or flexure 40 is interposed between the beam 12' and the supporting structure 14'. A similar flexure 42 is interposed between the other end of the beam 12' and the supporting member 16'. The two flexures or reduced thickness areas 40 and 42 reduce the amount of rotational moment transferred to the mounting supports 14' and 16' to further improve the performance of the device.

As previously stated, it is possible to reduce or null the moments at the end of the beam at the expense of some normal residual force. How this is accomplished can best be understood by referring to FIG. 3 which shows the parts displaced during vibration. A line 44 shows the centerline of the beam when the beam is in its rest position. Forces and moments existing when the beam is displaced in the direction shown are also illustrated. The moments exerted by the beam on the beam supports are indicated by the directed arcs 46 and 48. These moments are transmitted to the ends of the beam supports 14' and 16'. Without the counterbalances 18' and 20' a normal force exerted by the beam on the beam supports 14' and 16' would be in the direction of the arrows 50 and 52. If the counterbalances 18' and 20' are proportioned to over compensate the transverse force appearing at the end of the beam, there is a residual force at each end of the beam 12' in the opposite direction, that is, in the direction of arrows 54 and 56 and, in addition to the moments illustrated by the arrows 46 and 48, there is a resultant moment at the end of each beam support 14' and 16' equal to the product of the residual force and the length of the beam support. These moments are opposite to the moments indicated by the directed arcs 46 and 48 and are added at the ends of the beam supports 14' and 16'. The length of the beam supports 14' and 16' in combination with the residual forces 52 and 54 can be made such that the added opposite moments are equal in magnitude so that they cancel. Then the moments at the ends of the beam supports 14' and 16' are made to be zero at the expense of the residual forces indicated by the arrows 52 and 54. Increasing the lengths of the beam supports 14' and 16' decreases the residual force required to null the moments at the ends of the beam supports. For a given beam support length, the residual forces or moments can be reduced, each at the expense of increase in the other. Choice of beam support length and allocation of residual forces and moments are determined for each particular application. The choice depends in part on the characteristics of the device in which the vibrating beam force transducer is used. For a pendulous accelerometer, for example, the forces on the proof mass suspension from forces and moments at the end of the beam support would be considered along with linear and angular stiffness of the proof mass suspension in various directions.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A vibrating beam transducer, comprising:
    a vibratory beam having first and second ends;
    a supporting structure for supporting one of said first and second ends of said vibrating beam;
    means for interconnecting the supported end of said vibrating beam and said supporting structure; and
    means for reducing the amount of vibratory energy transferred to said supporting structure including a counterbalance, said counterbalance including a pair of members which extend outwardly from said beam, said members connected to said beam on one end and having a free end extending toward said supporting structure wherein said interconnecting means includes a flexure interposed between an end of the vibrating beam and said supporting structure.

2. A vibrating beam transducer as recited in claim 1, wherein said counterbalances are configured to minimize rotational forces about an axis generally normal to the plane of the vibratory beam, transferred to said supporting structure.

3. A vibrating beam transducer as recited in claim 1, wherein said counterbalances are configured to minimize forces generally parallel to the plane of said vibratory beam and generally normal to a longitudinal axis of said beam, transferred to said supporting structure.

4. A vibrating beam transducer as recited in claim 1, wherein each counterbalance includes a pair of members extending outwardly from each end of the vibratory beam.

5. A vibrating beam transducer as recited in claim 4, wherein said members extend from the vibratory beam in a spaced parallel relation thereto.

6. A vibrating beam transducer as recited in claim 4, wherein said members may be configured to select the relative amounts of rotational forces about an axis generally normal to the plane of said vibratory beam or forces generally parallel to the plane of said vibratory beam and generally normal to a longitudinal axis of said beam, transferred to said supporting structure.

7. A vibrating beam transducer as recited in claim 4, wherein said members are configured to reduce rotational forces about an axis generally normal to the plane of said vibratory beam, transferred to said supporting structure substantially to zero.

8. A vibrating beam transducer as recited in claim 4, wherein said members are configured to reduce forces generally parallel to the plane of said vibratory beam and generally normal to a longitudinal axis of said beam, transferred to said supporting structure substantially to zero.

9. A vibrating beam transducer, comprising:
a vibratory beam having first and second ends;
a supporting structure for supporting one of said first and second ends of said vibrating beam;
means for interconnecting the supported end of said vibrating beam and said supporting structure; and
means for reducing the amount of vibratory energy transferred to said supporting structure including a pair of counterbalancing members mechanically coupled at one end to the supported end of said beam and having a free end extending outwardly from said beam and toward said supporting structure wherein said interconnecting means includes a flexure interposed between an end of the vibrating mean and said supporting structure.

10. A vibrating beam transducer as recited in claim 9, wherein said members are configured to minimize rotational forces about an axis generally normal to the plane of said vibratory beam, transferred to said supporting structure.

11. A vibrating beam transducer as recited in claim 9, wherein said members are configured to minimize forces generally parallel to the plane of said vibratory beam and generally normal to a longitudinal axis of said beam, transferred to said supporting structure.

12. A vibrating beam transducer as recited in claim 9, wherein each of said counterbalancing members extends outwardly from one of the ends of the vibratory beam in a parallel relation thereto.

13. A method for reducing the transfer of energy from a vibratory beam having first and second ends and used in a transducer, comprising:
supporting said vibratory beam at one of the first and second ends thereof from a supporting structure;
interconnecting the supported end of said vibrating beam and said supporting structure; and
reducing the amount of vibratory energy transferred to said supporting structure by providing a counterbalance at the supported one of said ends of said beam, the counterbalance being mechanically coupled to said beam at one end and having counterbalancing members extending outwardly from said beam at a free end and toward said supporting structure wherein the step of interconnecting includes interposing a flexure between each end of the vibratory beam and the supporting structure.

14. The method recited in claim 13, including supporting each of said ends from said supporting structure and providing a counterbalance at each of said first and second ends.

15. The method recited in claim 14, wherein said counterbalances are configured to minimize rotational forces about an axis generally normal to the plane of said vibratory beam, transferred to said supporting structure.

16. The method recited in claim 14, wherein said counterbalances are configured to minimize forces generally parallel to the plane of said vibratory beam and generally normal to a longitudinal axis of said beam, transferred to said supporting structure.

17. The method recited in claim 14, wherein providing each counterbalance includes providing a pair of members extending outwardly from each end of the vibratory beam.

* * * * *